United States Patent [19]

Miyoshi et al.

[11] 4,415,718
[45] * Nov. 15, 1983

[54] TERPOLYMER PRODUCED FROM ETHYLENE, PROPYLENE AND BUTYLENE-1

[75] Inventors: Mituji Miyoshi, Kanagawa; Kazuo Matsuura, Kawasaki; Yoshio Tajima, Tokyo, all of Japan

[73] Assignee: Nippon Oil Company, Ltd., Tokyo, Japan

[ * ] Notice: The portion of the term of this patent subsequent to Mar. 30, 1999 has been disclaimed.

[21] Appl. No.: 348,741

[22] Filed: Feb. 16, 1982

Related U.S. Application Data

[62] Division of Ser. No. 184,238, Sep. 5, 1980, abandoned.

[30] Foreign Application Priority Data

Sep. 5, 1979 [JP]  Japan ............................... 54-112915

[51] Int. Cl.³ .......................................... C08F 210/06
[52] U.S. Cl. ................................. 526/348.6; 428/215; 526/124; 526/125; 526/141; 526/142; 526/144; 526/916
[58] Field of Search ............................. 526/348.6, 916

[56] References Cited

U.S. PATENT DOCUMENTS

| | | | |
|---|---|---|---|
| 3,959,409 | 5/1976 | Frese et al. | 526/348.6 |
| 4,109,071 | 8/1978 | Berger et al. | 526/114 |
| 4,115,319 | 9/1978 | Scata et al. | 526/125 |
| 4,120,820 | 10/1978 | Birkelbach | 252/429 B |
| 4,223,117 | 9/1980 | Sano et al. | 526/141 |
| 4,322,514 | 3/1982 | Miyoshi et al. | 526/348.6 |

FOREIGN PATENT DOCUMENTS 2637991  3/1978  Fed. Rep. of Germany .
1563977  4/1980  United Kingdom .

OTHER PUBLICATIONS

Translated Abstract of Japanese No. 104687, (1978), No. 791975, (1976).

*Primary Examiner*—Stanford M. Levin
*Attorney, Agent, or Firm*—Wyatt, Gerber, Shoup, Scobey & Badie

[57]  ABSTRACT

Using a catalyst comprising (1) a solid substance which contains magnesium and titanium, (2) an organometallic compound and (3) an electron donor, there are polymerized ethylene, propylene and 1-butene to obtain a soft or semi-hard terpolymer of low crystallinity containing 75.2 to 91.5 mol % propylene, 7.5 to 14.9 mol % ethylene and 1.0 to 9.9 mol % 1-butene.

3 Claims, No Drawings

TERPOLYMER PRODUCED FROM ETHYLENE, PROPYLENE AND BUTYLENE-1

This is a division of application Ser. No. 184,238, filed Sept. 5, 1980, now abandoned.

BACKGROUND OF THE INVENTION

This invention relates to soft or semi-hard terpolymers having excellent transparency and low crystallinity, and to a process for preparing same.

As a soft or semi-hard polymer there has heretofore been known polyvinyl chloride. In recent years, moreover, copolymers consisting principally of ethylene have become known. Also, there have been proposed various soft or semi-hard copolymers consisting mainly of propylene, but these copolymers have not yet been put to practical use.

Recently proposed is a process for preparing a soft or semi-hard copolymer by random copolymerization of propylene and 1-butene (see Japanese Patent Laying Open Print No. 79984/1978). This process, however, is not commercially attractive because the expensive 1-butene must be used in large amounts.

Furthermore, in Japanese Patent Laying Open Print No. 104687/1978 there is disclosed a process for preparing a propylene-ethylene copolymer containing 63 to 85 mol% of propylene. However, the copolymer obtained by this process is not satisfactory in strength, it being softer with a Shore A hardness of 30 to 99 and low in tensile strength.

As to terpolymers consisting of ethylene, propylene and α-olefin of $C_4$ or more, methods for their preparation are known for example from Japanese Patent Laying Open Prints Nos. 79195/1976 and 26883/1978. In all of these methods, a crystalline terpolymer is prepared using a catalyst comprising the combination of a $TiCl_3$-containing component and an organoaluminum compound. These methods, however, are disadvantageous in that a soft or semi-hard copolymer cannot be obtained.

It is an object of this invention to provide soft or semi-hard terpolymers having excellent transparency and low crystallinity, and a process for preparing same.

Other objects and advantages of this invention will become apparent from the following description.

SUMMARY OF THE INVENTION

The objects of this invention are achieved by preparing a terpolymer containing 75.2 to 91.5 mol% propylene units, 7.5 to 14.9 mol% ethylene units and 1.0 to 9.9 mol% 1-butene units by the use of a catalyst comprising (1) a solid substance which contains magnesium and titanium, (2) an organometallic compound and (3) an electron donor.

Terpolymers according to this invention have remarkably superior characteristics as compared with conventional binary copolymers. Additionally, the process for preparing the terpolymers of the invention is economical because it requires only a very small amount of the expensive starting α-olefins as compared with the preparation of conventional binary copolymers.

DETAILED DESCRIPTION OF THE INVENTION

The catalysts used in the process of this invention comprise the combination of (1) a solid substance which contains magnesium and titanium, (2) an organometallic compound and (3) an electron donor. The said solid substance is obtained by supporting, in known manner, a titanium compound on an inorganic solid carrier. Examples of the inorganic solid carrier include metallic magnesium, magnesium hydroxide, magnesium carbonate, magnesium oxide, magnesium chloride, as well as double salts, double oxides, carbonates, chlorides and hydroxides containing a metal selected from silicon, aluminum and calcium and magnesium atom. These inorganic solid carriers are subsequently subjected to treatment or reaction with an oxygen-containing compound, a sulfur-containing compound, a hydrocarbon, or a halogen-containing substance.

As the oxygen-containing compound referred to above, mention may be made of alcohols, aldehydes, ketones, ethers, carboxylic acids, and derivatives thereof. As the sulfur-containing compound, thiophene and thiols are preferred. As the hydrocarbon, aromatic hydrocarbons are preferred such as durene, anthracene, and naphthalene. And as the halogen-containing substance, halogenated hydrocarbons are preferred such as 1,2-dichloroethane, n-butyl chloride, t-butyl chloride, and p-chlorobenzene.

Other examples of the solid substance suitably employable in the process of this invention include reaction products between organomagnesium compounds such as the so-called Grignard compounds and titanium compounds. The organomagnesium compounds are, for example, those represented by the general formulae $RMgX$, $R_2Mg$, and $RMg(OR)$ in which R is an organic radical having 1 to 24 carbon atoms and X is halogen, and ether complexes thereof. They also include these organomagnesium compounds after modification with other organometallic compounds, e.g. organosodium, organolithium, organopotassium, organoboron, organocalcium, and organozinc.

By way of illustrating the titanium compound used in the process of this invention, mention may be made of halides, alkoxyhalides, oxides, and halogenate oxides, of titanium, for example, tetravalent titanium compounds which is represented by the general formula $Ti(OR)_nX_{4-n}$ wherein R is alkyl, aryl or aralkyl having 1 to 24 carbon atoms and n is $0 \leq n23 \, 4$ such as titanium tetrachloride, titanium tetrabromide, titanium tetraiodide, monoethoxytrichlorotitanium, diethoxydichlorotitanium, triethoxymonochlorotitanium, tetraethoxytitanium, monoisopropoxytrichlorotitanium, diisopropoxydichlorotitanium, and tetraisopropoxytitanium; various titanium trihalides obtained by reducing titanium tetrahalides with hydrogen, aluminum, titanium or an organometallic compound; and trivalent titanium compounds such as compounds obtained by reducing various tetravalent alkoxytitanium halides of the general formula $Ti(OR)_mX_{4-m}$ wherein R is alkyl, aryl or aralkyl having 1 to 24 carbon atoms and m is $0 < m < 4$, with an organometallic compound of a metal of the groups I to III of the Periodic Table.

Of these titanium compounds, tetravalent titanium compounds are specially preferred.

By way of illustration, the following solid substances may be mentioned as typical examples (in the following formulae R represents an organic radical and X is halogen): $MgO-R_x-TiCl_4$ system (see Japanese Patent Publication No. 3514/1976), $Mg-SiCl_4-ROH-TiCl_4$ system (see Japanese Patent Publication No. 23864/1975), $MgCl_2-Al(OR)_3-TiCl_4$ system (see Japanese Patent Publications Nos. 152/1976 and 15111/1977), $MgCl_2$- aromatic hydrocarbon-TiCl$_4$ system (see Japanese Patent Publication No. 48915/1977), MgCl$_2$-SiCl$_4$-ROH-TiCl$_4$ system (see Japanese Patent Publication No. 106581/1974), Mg(OOCR)$_2$-Al(OR)$_3$-TiCl$_4$ system (see Japanese Patent Publication No. 11710/1977), MgCl$_2$-RX-TiCl$_4$ system (see Japanese Patent Laying Open Print No. 42584/1977), Mg-POCl$_3$-TiCl$_4$ system (see Japanese Patent Publication No. 153/1976), MgCl$_2$-AlOCl-TiCl$_4$ system (see Japanese Patent Publication No. 15316/1979), RMgX-TiCl$_4$ system (see Japanese Patent Publication No. 39470/1975), RMgX-chlorophenol-TiCl$_4$ system (see Japanese Patent Publication No. 12953/1979), RMgX-phenol-TiCl$_4$ system (see Japanese Patent Publication No. 12954/1979).

As the organometallic compounds used in the process of this invention, mention may be made of organometallic compounds of Groups I–IV metals of the Periodic Table which are known as a component of Ziegler catalysts, among which organoaluminum compounds and organozinc compounds are specially preferred, for example, organoaluminum compounds of the general formulae R$_3$Al, R$_2$AlX, RAlX$_2$, R$_2$AlOR, RAl(OR)X, and R$_3$Al$_2$X$_3$ in which R is C$_1$ to C$_{20}$ alkyl or aryl and R may be alike or different and X is halogen, and organozinc compounds of the general formula R$_2$Zn$_n$ in which R is C$_1$ to C$_{20}$ alkyl and R may be alike or different, such as triethylaluminum, triisobutylaluminum, trihexylaluminum, trioctylaluminum, diethylaluminum chloride, ethylaluminum sesquichloride, diethylzinc, and mixtures thereof.

In the process of this invention, the amount of these organometallic compounds to be used is not specially limited, but usually 0.1 to 1000 mols per mol of the titanium compound may be used.

As the electron donor used in the process of the invention are mentioned alcohols, ethers, ketones, aldehydes, organic acids, organic acid esters, acid halides, acid amides, amines, and nitriles.

Examples of alcohols are those of C$_1$ to C$_{18}$ such as methyl alcohol, ethyl alcohol, n-propyl alcohol, isopropyl alcohol, allyl alcohol, n-butyl alcohol, isobutyl alcohol, sec-butyl alcohol, t-butyl alcohol, n-amyl alcohol, n-hexyl alcohol, cyclohexyl alcohol, decyl alcohol, lauryl alcohol, myristyl alcohol, cetyl alcohol, stearyl alcohol, oleyl alcohol, benzyl alcohol, naphthyl alcohol, phenol, and cresol.

Examples of ethers are those of C$_2$ to C$_{20}$ such as dimethyl ether, diethyl ether, dibutyl ether, diisoamyl ether, anisole, phenetole, diphenyl ether, phenylallyl ether, and benzofuran.

Examples of ketones are those of C$_3$ to C$_{18}$ such as acetone, methyl ethyl ketone, methyl isobutyl ketone, methyl phenyl ketone, ethyl phenyl ketone, and diphenyl ketone.

Examples of aldehydes are those of C$_2$ to C$_{15}$ such as acetaldehyde, propionaldehyde, octylaldehyde, benzaldehyde, and naphthaldehyde.

Examples of organic acids are those of C$_1$ to C$_{24}$ such as formic acid, acetic acid, propionic acid, butyric acid, valeric acid, pivalic acid, caproic acid, caprylic acid, stearic acid, oxalic acid, malonic acid, succinic acid, adipic acid, methacrylic acid, benzoic acid, toluic acid, anisic acid, oleic acid, linoleic acid, and linolenic acid.

As organic acid esters are mentioned those of C$_2$ to C$_{30}$ such as methyl formate, methyl acetate, ethyl acetate, propyl acetate, octyl acetate, ethyl propionate, methyl butyrate, ethyl valerate, methyl methacrylate, methyl benzoate, ethyl benzoate, propyl benzoate, octyl benzoate, phenyl benzoate, benzyl benzoate, ethyl o-methoxybenzoate, ethyl p-methoxybenzoate, butyl p-ethoxybenzoate, methyl p-toluylate, ethyl p-ethylbenzoate, methyl salicylate, phenyl salicylate, methyl naphthoate, ethyl naphthoate, and ethyl anisate.

As acid halides are mentioned organic acid halides of C$_2$ to C$_{15}$ such as acetyl chloride, benzyl chloride, toluic acid chloride, and anisic acid chloride.

As acid amides are mentioned organic acid amides such as acetic amide, benzoic acid amide, and toluic acid amide.

As amines are mentioned organic amines such as methyl amine, ethyl amine, diethyl amine, tributyl amine, piperidine, tribenzyl amine, aniline, pyridine, picoline, and tetramethylenediamine.

As nitriles are mentioned organic nitriles such as acetonitrile, benzonitrile, and tolunitrile.

These electron donors, among which organic acid esters or ethers are specially preferred, may be used alone or in combination of two or more.

As previously noted, the catalyst used in the process of this invention comprises (1) a solid substance which contains magnesium and titanium, (2) an organometallic compound and (3) an electron donor, in which the electron donor (3) may be fixed wholly or partially to the solid substance (1), or the whole or part of the electron donor (3) may be an adduct with the organometallic compound (2), or the whole of the electron donor or the remainder of the electron donor except the portion fixed to the solid substance (1) and/or the remainder of the electron donor except the portion used as an adduct with the organometallic compound (2) may be added to the polymerization system.

The following are typical examples of the method of fixing electron donor to the solid substance (1):

(i) Co-pulverizing together a magnesium-containing substance, a titanium compound and the electron donor.

(ii) Adding a titanium compound to the reaction product of a magnesium-containing substance and the electron donor, followed by co-pulverizing.

(iii) Adding a magnesium-containing substance to the reaction product of the electron donor and a titanium compound, followed by co-pulverizing.

(iv) Co-pulverizing a magnesium-containing substance and the electron donor, thereafter contacting a titanium compound with the resulting product in liquid phase or gas phase.

(v) Further contacting in liquid phase a titanium compound with the product obtained in the above (i)–(iii).

Co-pulverizing apparatus is not specially limited, but usually employed are ball mill, vibration mill, rod mill, and impact mill. Conditions for the co-pulverization, including co-pulverizing temperature and time, can be decided easily by those skilled in the art according to the pulverization system adopted. In general, the pulverizing temperature ranges from 0° to 50° C. and the pulverizing time from 0.5 to 50 hours, preferably from 1 to 30 hours.

In the case of contacting a titanium compound in liquid phase in the foregoing method (iv) or (v), the titanium compound may be contacted directly as a liquid or in an inert solvent such as hexane or heptane at a reaction temperature ranging from 0° to 150° C., then the solid component is separated and washed with an inert solvent, now ready for use as the solid component in this invention.

In the process of this invention, the amount of a titanium compound to be used in preferably adjusted so that the titanium content of the resulting solid component is within the range of 0.5% to 10% by weight. In order to attain a well-balanced activity per titanium and that per solid, the range of 1% to 8% by weight is specially desirable.

In the case of using the electron donor as an adduct with the organometallic compound (2), the molar ratio of the electron donor to the organometallic compound is preferably in the range of 1:2 to 2:1.

In the process of this invention it is desirable that, in any of the foregoing modes of use of the electron donor, the total amount of electron donor present in the catalyst system be not less than 0.05 mol, preferably 0.05 to 10 mols and most preferably 0.2 to 10 mols, based on the amount (gram-atom) of magnesium in the catalyst system.

In this invention, ethylene, propylene and 1-butene are polymerized using a catalyst comprising (1) a solid substance which contains magnesium and titanium, (2) an organometallic compound and (3) an electron donor, to obtain a terpolymer containing 75.2 to 91.5 mol%, preferably 77.0 to 86.0 mol% and more preferably 77.0 to 83.5 mol% of propylene units, 7.5 to 14.9 mol%, preferably 8.0 to 14.0 mol% and more preferably 10.0 to 14.0 mol% of ethylene units, and 1.0 to 9.9 mol%, preferably 6.0 to 9.0 mol% and more preferably 6.5 to 9.0 mol% of 1-butene units. The terpolymer thus obtained by this invention are soft or semi-hard terpolymers having excellent transparency and low crystallinity. The above propylene content, ethylene content and 1-butene content means the content of repeating unit derived from the respective monomers. By feeding each monomer into the polymerization system in a quantitative relation according to its content, there can be obtained a terpolymer having the desired monomer ratio.

The terpolymers of this invention have a moderate melting point based on DSC of 50° to 145° C., a haze value not larger than 40% when pressed to the thickness of 0.5 mm at 190° C. and measured according to the method defined by JIS K 6714, have a Shore C hardness (JIS) of usually 20 to 80, preferably 20 to 70 and more preferably 20 to 40, and have a density usually in the range of 0.86 to 0.91. Thus they possess good properties.

In the terpolymers of this invention there are contained only very small amounts of boiling n-heptane insoluble substances, usually only about 0.01% to about 5% by weight, so low that it is not necessary to remove them; that is, even without removal of boiling n-heptane insoluble material the terpolymers prepared according to the process of this invention exhibit excellent transparency and other superior properties. These include, good processability, anti-blocking properties, heat sealing properties and flexibility, so that they can be formed suitably into various products, including films, sheets and hollow containers. Furthermore, the strength, impact resistance, transparency and low temperature characteristics if the terpolymers of this invention can be improved by blending with various thermoplastic resins such as high-, medium- and low-density polyethylenes, polypropylenes, polybutenes, poly-4-methylpentene-1, and polystyrenes. Thus, they can be used also as resin modifier.

In the terpolymers of this invention, if the content of ethylene, of propylene and 1-butene are outside the condition specified herein, there will not be obtained terpolymers having the superior properties of the products of in this invention. For example, the terpolymers obtained will be inferior in tensile strength and in transparency.

The polymerization reaction using the catalyst of this invention is carried out in the same manner as the conventional olefin polymerization reaction using a Ziegler type catalyst. That is, the reaction is carried out in substantially oxygen- and water-free conditions, in the gas phase or liquid phase in the presence of an inert solvent or with monomers as solvent. Polymerization conditions involve temperatures ranging from 20° to 300° C., preferably from 40° to 180° C., and pressures from atmospheric pressure to 70 kg/cm$^2$·G, preferably from 2 to 60 kg/cm$^2$·G. The molecular weight can be adjusted to some extent by changing polymerization conditions such as the polymerization temperature and the molar ratio of catalyst, but the addition of hydrogen into the polymerization system is more effective for this purpose. Of course, using the catalyst of this invention there can be performed without any trouble two or more stage polymerization reactions having different polymerization conditions such as different hydrogen concentrations and different polymerization temperatures.

Working examples of this invention are given below for purpose of illustration only, and are not intended to limit the invention.

EXAMPLE 1

(1) Catalyst Component Preparation 10 g. of anhydrous magnesium chloride and 0.5 ml. of 1,2-dichloroethane were placed in a stainless steel pot having a content volume of 400 ml. and containing 25 stainless steel balls each ½ inch in diameter, then ball milling was performed for 16 hours at room temperature in a nitrogen atmosphere. Thereafter, 1.8 g. of titanium tetrachloride was added and a ball milling was continued for 16 hours at room temperature in a nitrogen atmosphere. The resulting solid powder contained 39 mg. of titanium per gram thereof.

(2) Polymerization

A 2 liter stainless steel autoclave equipped with an induction stirrer was purged with nitrogen, into which were then charged 1 l of refined n-hexane, 2 millimols of triethylaluminum, 0.7 millimol of ethyl benzoate and 80 mg. of the solid powder obtained above, and the temperature was raised to 90° C. with stirring. The system was pressurized to 1.9 kg/cm$^2$·G due to the vapor pressure of hexane, then a mixed gas consisting of 80 mol% propylene, 13 mol% 1-butene and 7 mol% ethylene was introduced to a total pressure of 6 kg/cm$^2$.G, under which condition a polymerization was started. The polymerization was continued for 1 hour while the mixed gas was introduced continuously so as to maintain the total pressure at 6 kg/cm$^2$·G.

Thereafter, the interior of the autoclave was transferred into a large amount of isopropyl alcohol to allow terpolymer to precipitate, followed by washing and then drying overnight in a reduced pressure drier at 50° C., to yield 110 g. of terpolymer.

The catalyst activity was 35,200 g.polymer/g.Ti, and the terpolymer had the following physical properties.

| | |
|---|---|
| Shore C hardness (JIS) | 31 |
| Haze (0.5mm sheet) | 15% |
| Boiling n-heptane insoluble | 0.51 wt. % |

| | |
|---|---|
| portion | |
| Composition of the terpolymer (mol %) | Propylene  Ethylene  1-Butene<br>80.5         12.6      6.9 |

COMPARATIVE EXAMPLE 1

Polymerization was made in the same manner as in Example 1 except that the composition of the mixed gas was changed into 88 mol% propylene and 12 mol% 1-butene. As a result, 105 g. of binary copolymer obtained. The physical properties of this copolymer are set out in Table 1.

COMPARATIVE EXAMPLE 2

Polymerization was made in the same manner as in Example 1 except that the composition of the mixed gas was changed into 95 mol% propylene and 5 mol% ethylene. As a result, 103 g. of binary copolymer was obtained. The physical properties of this copolymer are set out in Table 1.

COMPARATIVE EXAMPLE 3

Polymerization was made in the same manner as in Example 1 except that the composition of the mixed gas was changed into 84.5 mol% propylene, 14 mol% 1-butene and 1.5 mol% ethylene. As a result, 91 g. of terpolymer was obtained. The physical properties of this terpolymer are set out in Table 1.

TABLE 1

| | Terpolymer Composition (mol %) | | | Boiling n-heptane insoluble portion (wt. %) | Haze (0.5mm sheet) (%) |
|---|---|---|---|---|---|
| | Propylene | Ethylene | 1-Butene | | |
| Comp. Ex. 1 | 91 | — | 9 | 60.3 | 53.7 |
| Comp. Ex. 2 | 90 | 10 | — | 57.8 | 51.6 |
| Comp. Ex. 3 | 89 | 3 | 8 | 79.5 | 49.0 |

Reference to Table 1 clearly shows that the binary copolymers obtained in Comparative Examples 1 and 2, and even the terpolymer obtained in Comparative Example 3 when deviating from the conditions specified in this invention, contain a large proportion of boiling n-heptane insoluble products and are much inferior in transparency as compared with the terpolymer obtained in Example 1.

COMPARATIVE EXAMPLE 4

Polymerization was conducted in the same manner as in Example 1 except that the composition of the mixed gas was changed into 83 mol% propylene, 7 mol% 1-butene and 10 mol% ethylene, to yield 110 g. of copolymer. The composition of the terpolymer was 77 mol% propylene, 4 mol% 1-butene and 19 mol% ethylene. The terpolymer was softer, having a Shore A hardness of 69, and low in tensile strength, thus was inferior in strength.

COMPARATIVE EXAMPLE 5

Polymerization was conducted in the same manner as in Example 1 except that the composition of the mixed gas was changed into 59.5 mol% propylene, 40 mol% 1-butene and 0.5 mol% ethylene, to yield 82 g. of terpolymer. The composition of the terpolymer was 70 mol% propylene, 29 mol% 1-butene and 1 mol% ethylene. The terpolymer was hard, having a Shore C hardness of 83, and was superior in transparency, but is disadvantageous in that it is not economical because the amount of 1-butene used is large.

COMPARATIVE EXAMPLE 6

Polymerization was conducted in the same manner as in Example 1 except that the composition of the mixed gas was changed into 82 mol% propylene, 12 mol% 1-butene and 6 mol% ethylene and that ethyl benzoate was not added into the polymerization system, to yield 115 g. of terpolymer. The composition of the terpolymer was 81 mol% propylene, 7 mol% 1-butene and 12 mol% ethylene. The terpolymer exhibited stickiness on the surface of a pressed sheet thereof, having a low tensile strength and thus being inferior in strength.

EXAMPLE 2

Polymerization was conducted in the same manner as in Example 1 except that the composition of the mixed gas was changed into 83 mol% 13 mol% 1-butene and 4 mol% ethylene, to yield 98 g. of terpolymer. The catalyst activity was 31,400 g.polymer/g.Ti. The polymer had the following physical properties.

| | |
|---|---|
| Shore C hardness (JIS) | 38 |
| Haze (0.5mm sheet) | 18% |
| Boiling n-heptane (insoluble portion | 0.6 wt. % |
| Composition of the terpolymer (mol %) | Propylene  Ethylene  1-Butene<br>84.7         8.2       7.1 |

EXAMPLE 3

Polymerization was made in the same way as in Example 1 except that the composition of the mixed gas was changed into 89 mol% propylene, 5 mol% 1-butene and 6 mol% ethylene, to yield 120 g. of terpolymer. The catalyst activity was 38,400 g.polymer/g.Ti. The terpolymer had the following physical properties.

| | |
|---|---|
| Shore C hardness (JIS) | 37 |
| Haze (0.5mm sheet) | 19% |
| Boiling n-heptane insoluble portion | 0.8 wt. % |
| Composition of the terpolymer (mol %) | Propylene  Ethylene  1-Butene<br>85.3         11.7      3.0 |

EXAMPLE 4

Polymerization was made in the same way as in Example 1 except that the polymerization temperature was changed to 50° C., to yield 68 g. of terpolymer. The catalyst activity was 21,800 g.polymer/g.Ti. The physical properties of the terpolymer were as follows.

| | |
|---|---|
| Shore C hardness (JIS) | 31 |
| Haze (0.5mm sheet) | 16% |
| Boiling n-heptane insoluble portion | 0.50 wt. % |
| Composition of the terpolymer (mol %) | Propylene  Ethylene  1-Butene<br>80.3         13.0      6.7 |

EXAMPLE 5

(1) Catalyst Component Preparation

A 300 ml. three necked flask equipped with a stirrer and a reflux condenser was purged with nitrogen, into which were then charged 10 g. of a commercially available anhydrous magnesium chloride and 33.6 g. of ethanol, followed by stirring at 100° C. to allow magnesium chloride to dissolve, then 35.5 g. of silicon tetrachloride was dropwise added over a period of 10 minutes. Thereafter, the reaction was allowed to proceed for an additional hour and then drying was applied at 250° C. under reduced pressure to obtain a white powdered reaction product. The white powder thus obtained was mixed with 50 mols of titanium tetrachloride and reaction was allowed to proceed for 1 hour at 130° C. Thereafter, the reaction product was washed with hexane, and the washing was repeated until titanium tetrachloride was not detectable in the washing.

The solid portion obtained was dried, analyzed and found to contains 21.1 mg. of titanium per gram thereof.

(2) Polymerization

Polymerization was made in the same way as in Example 1 except that there were used 150 mg. of the solid powder obtained above, to yield 113 g. of terpolymer. The catalyst activity was 35,800. polymer/g.Ti, and the physical properties of the terpolymer were as follows.

| | | | |
|---|---|---|---|
| Shore C hardness (JIS) | 32 | | |
| Haze (0.5mm sheet) | 15% | | |
| Boiling n-heptane insoluble portion | 0.51 wt. % | | |
| Composition of the terpolymer (mol %) | Propylene 80.6 | Ethylene 12.6 | 1-Butene 6.8 |

EXAMPLE 6

Polymerization was made in the same way as in Example 5 except that the composition of the mixed gas was changed into 80 mol% propylene, 16 mol% 1-butene and 4 mol% ethylene, to yield 99 g. of terpolymer. The catalyst activity was 31,300 g.polymer/g.Ti, and the physical properties of the terpolymer were as follows.

| | | | |
|---|---|---|---|
| Shore C hardness (JIS) | 37 | | |
| Haze (0.5mm sheet) | 15% | | |
| Boiling n-heptane insoluble portion | 0.55 wt. % | | |
| Composition of the terpolymer (mol %) | Propylene 81.9 | Ethylene 9.1 | 1-Butene 9.0 |

EXAMPLE 7

Polymerization was made in the same way as in Example 5 except that the composition of the mixed gas was changed into 76.5 mol% propylene, 170 mol% 1-butene and 6.5 mol% ethylene and that the polymerization temperature was 85° C., to yield 108 g. of terpolymer. The catalyst activity was 34,200 g.polymer/g.Ti, and the physical properties of the terpolymer were as follows.

| | | | |
|---|---|---|---|
| Shore C hardness (JIS) | 29 | | |
| Haze (0.5mm sheet) | 13% | | |
| Boiling n-heptane insoluble portion | 0.47 wt. % | | |
| Composition of the terpolymer (mol %) | Propylene 77.5 | Ethylene 13.0 | 1-Butene 9.5 |

We claim:

1. An ethylene/propylene/1-butene terpolymer characterized by containing 75.2 to 91.5 mol% propylene, 7.5 to 14.9 mol% ethylene and 1.0 to 9.9 mol% 1-butene, having a melting point based on DSC of 20° to 145° C., a haze value not larger than 40% when pressed to the thickness of 0.5 mm at 190° C. and measured according to JIS K 6714, a Shore C hardness based on JIS of 20 to 80 and a density of 0.86 to 0.91, and containing 0.01% to 5% by weight of boiling n-heptane insoluble portion.

2. The terpolymer as defined in claim 1, in which the propylene content, ethylene content and 1-butene content are 77.0 to 86.0 mol%, 8.0 to 14.0 mol% and 9.0 mol%, respectively.

3. The terpolymer as defined in claim 1, in which the propylene content, ethylene content and 1-butene content are 77.0 to 83.5 mol%, 10.0 to 14.0 mol% and 6.5 to 9.0 mol%, respectively.

* * * * *